(12) United States Patent
Oshima et al.

(10) Patent No.: US 11,823,097 B2
(45) Date of Patent: Nov. 21, 2023

(54) PROCESS MANAGEMENT SUPPORT SYSTEM, PROCESS MANAGEMENT SUPPORT METHOD, AND PROCESS MANAGEMENT SUPPORT PROGRAM

(71) Applicant: Hitachi, Ltd., Tokyo (JP)

(72) Inventors: Kosuke Oshima, Tokyo (JP); Masumi Kawakami, Tokyo (JP); Makoto Ichii, Tokyo (JP); Akihiro Hori, Tokyo (JP); Yasufumi Suzuki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 330 days.

(21) Appl. No.: 17/413,051

(22) PCT Filed: Dec. 10, 2019

(86) PCT No.: PCT/JP2019/048199
§ 371 (c)(1),
(2) Date: Jun. 11, 2021

(87) PCT Pub. No.: WO2020/129742
PCT Pub. Date: Jun. 25, 2020

(65) Prior Publication Data
US 2022/0051148 A1 Feb. 17, 2022

(30) Foreign Application Priority Data
Dec. 17, 2018 (JP) .................. 2018-235780

(51) Int. Cl.
*G06F 9/44* (2018.01)
*G06Q 10/02* (2012.01)
(Continued)

(52) U.S. Cl.
CPC ............ *G06Q 10/02* (2013.01); *G06F 8/30* (2013.01); *G06F 11/3668* (2013.01); *G06Q 10/06314* (2013.01)

(58) Field of Classification Search
None
See application file for complete search history.

(56) References Cited

U.S. PATENT DOCUMENTS

2008/0010543 A1* 1/2008 Yamamoto .......... G06F 11/3688
714/38.1
2008/0221946 A1* 9/2008 Balon .................... G06Q 10/10
705/7.23

(Continued)

FOREIGN PATENT DOCUMENTS

JP 2008-021296 A 1/2008
JP 2016-024697 A 2/2016

OTHER PUBLICATIONS

International Search Report, dated Mar. 17, 2020, for International Application No. PCT/JP2019/048199.

*Primary Examiner* — Qamrun Nahar
(74) *Attorney, Agent, or Firm* — BAKER BOTTS L.L.P.

(57) ABSTRACT

Provided is a test facility management system that can evaluate, in a software development process requiring use of test facilities, progress of a process caused by increasing or decreasing a count of the test facilities. The test facility management system can include: a project progress forecast unit that stores a process information database, a facility reservation information database, a process progress history information database, and facility count proposed change information, calculates facility usage remaining time period for the software development process based on process progress history information, specifies a time range during which facilities of the count of proposed change are available, and forecasts, based on the available time range, the progress of the software development process when work for the facility usage remaining time period is carried out by the facilities of the count of the proposed change; and a user interface that outputs the forecasted progress information.

9 Claims, 9 Drawing Sheets

(51) Int. Cl.
*G06F 8/30* (2018.01)
*G06F 11/36* (2006.01)
*G06Q 10/0631* (2023.01)

(56) References Cited

U.S. PATENT DOCUMENTS

| | | | | |
|---|---|---|---|---|
| 2009/0313038 | A1* | 12/2009 | Machtelinck | G06Q 10/02 |
| | | | | 705/2 |
| 2018/0329805 | A1* | 11/2018 | Kurian | G06F 11/3672 |
| 2021/0390495 | A1* | 12/2021 | Upadhyay | G06Q 10/06314 |

* cited by examiner

PROCESS PROGRESS HISTORY INFORMATION 40

| # | PROJECT NAME (401) | PROCESS NAME (402) | PROGRESS RECORD DATE (403) | PROGRESS STATUS (404/405) |
|---|---|---|---|---|
| 1 | PROJECT 1 | PROCESS 1 | 2018/4/1 | 0% |
| 2 | PROJECT 1 | PROCESS 1 | 2018/4/2 | 10% |
| 3 | PROJECT 1 | PROCESS 1 | 2018/4/3 | 20% |

FIG. 5

FACILITY RESERVATION INFORMATION 50

| # | FACILITY NAME (501) | FACILITY TYPE (502) | USING PROJECT (503) | RESERVATION START DATE AND TIME (504) | RESERVATION END DATE AND TIME (505/506) |
|---|---|---|---|---|---|
| 1 | FACILITY 1 | FACILITY TYPE 1 | PROJECT 1 | 2018/4/1 9:00 | 2018/4/1 17:00 |
| 2 | FACILITY 2 | FACILITY TYPE 1 | PROJECT 2 | 2018/4/2 9:00 | 2018/4/2 17:00 |
| 3 | FACILITY 3 | FACILITY TYPE 1 | PROJECT 3 | 2018/4/3 9:00 | 2018/4/3 17:00 |

FIG. 6

SOURCE CODE CHANGE INFORMATION 60

| # | PROJECT NAME (601) | CHANGED DATE AND TIME (602) | CHANGED CONTENT (603/604) | CHANGED LINE COUNT (605) |
|---|---|---|---|---|
| 1 | PROJECT 1 | 2018/4/1 10:00 | IMPLEMENTED FUNCTION A | 30 |
| 2 | PROJECT 1 | 2018/4/1 14:00 | IMPLEMENTED FUNCTION B | 20 |
| 3 | PROJECT 1 | 2018/4/2 9:00 | FIXED BUG IN FUNCTION A | 10 |

PROJECT PROGRESS AND FACILITY AVAILABILITY STATUS

[ CHANGE FACILITY COUNT ]

| # | PROJECT NAME | PROGRESS RATE | DEADLINE DATE | FORECASTED COMPLETION DATE | FACILITY EXCESS/ SHORTAGE |
|---|---|---|---|---|---|
| 1 | PROJECT 1 | 80% | 2018/5/31 | 2018/5/31 | APPROPRIATE |
| 2 | PROJECT 2 | 40% | 2018/6/30 | 2018/7/15 | INSUFFICIENT |
| 3 | PROJECT 3 | 40% | 2018/7/31 | 2018/7/20 | SUFFICIENT |

PROCESS MANAGEMENT SUPPORT SYSTEM, PROCESS MANAGEMENT SUPPORT METHOD, AND PROCESS MANAGEMENT SUPPORT PROGRAM

TECHNICAL FIELD

The present invention relates to a technique that supports management of a software development process requiring the use of test facilities.

BACKGROUND ART

In software development, tests are carried out on a system (actual machine) on which software actually operates or on a simulator that simulates operation of the system. Test facilities such as the actual machines and simulators may be shared by a plurality of software development projects (hereinafter referred to as projects) in order to reduce costs. In order to complete each project on time, an appropriate quantity of test facilities is desired to be available in the project.

For example, as a method of optimizing the allocation of information technology (IT) resources to a project, PTL 1 proposes a system in which IT resources of a cloud-type system among test facilities are allocated based on the contents of a test.

CITATION LIST

Patent Literature

PTL 1: JP 2016-24697 A

SUMMARY OF INVENTION

Technical Problem

PTL 1 proposes a method of changing an IT resource reservation period based on the progress of the project, in addition to the allocation of IT resources based on the content of the test. However, considering that a project manager aims to complete the project within a deadline as much as possible, this cannot be handled with the technology of PTL 1. Instead, it is required to evaluate advance or delay of the progress of the project caused by increasing or decreasing the count of test facilities and add the test facilities, or to review the allocation of the test facilities among the plurality of projects.

The present invention has been made in view of the above circumstances, and an object of the present invention is to provide a technique that can appropriately evaluate the progress of a process caused by increasing or decreasing the count of test facilities in a software development process requiring the use of test facilities.

Solution to Problem

In order to achieve the above objectives, the process management support system according to one viewpoint is a process management support system that supports management of a software development process requiring use of facilities, the system including a storage unit storing information and a processor unit connected to the storage unit and executing predetermined processing. The storage unit stores process information indicating the facilities used in the software development process, facility reservation information indicating reservation statuses of a plurality of the facilities, process progress history information indicating a progress history of the software development process, and facility count proposed change information indicating proposed change of a count of the facilities used in the software development process. The processor unit calculates, based on the process progress history information, a facility usage remaining time period being a remaining time period required for a test using the facilities indicated by the process information in the software development process, specifies, based on the facility reservation information, an available time range during which the facilities of the count of the proposed change indicated by the facility count proposed change information are available, forecasts, based on the available time range, a progress of the software development process in the case when work for the facility usage remaining time period is changed to be carried out by the facilities of the count of the proposed change, and outputs information on the forecasted progress after the change.

Advantageous Effects of Invention

According to the present invention, it becomes possible to appropriately evaluate the progress of the process caused by increasing or decreasing the count of test facilities in the software development process requiring the use of test facilities.

DESCRIPTION OF EMBODIMENTS

Embodiments are described with reference to the drawings. It should be noted that the embodiments described below do not limit the invention according to the claims, and all of the elements and combinations thereof described in the embodiments are not necessarily indispensable for the means for solving the invention.

Further, in the following description, a "storage unit" includes one or more main storage devices (memories). At least one main storage device may be a volatile memory or a non-volatile memory. The storage unit is mainly used during processing by the processor unit.

Further, in the following description, a "processor unit" includes one or more processors. At least one processor is typically a microprocessor such as a central processing unit (CPU). Each of one or more processors may be single-core or multi-core. The processor may include a hardware circuit that performs some or all of the processing.

First Embodiment

Figure 1:
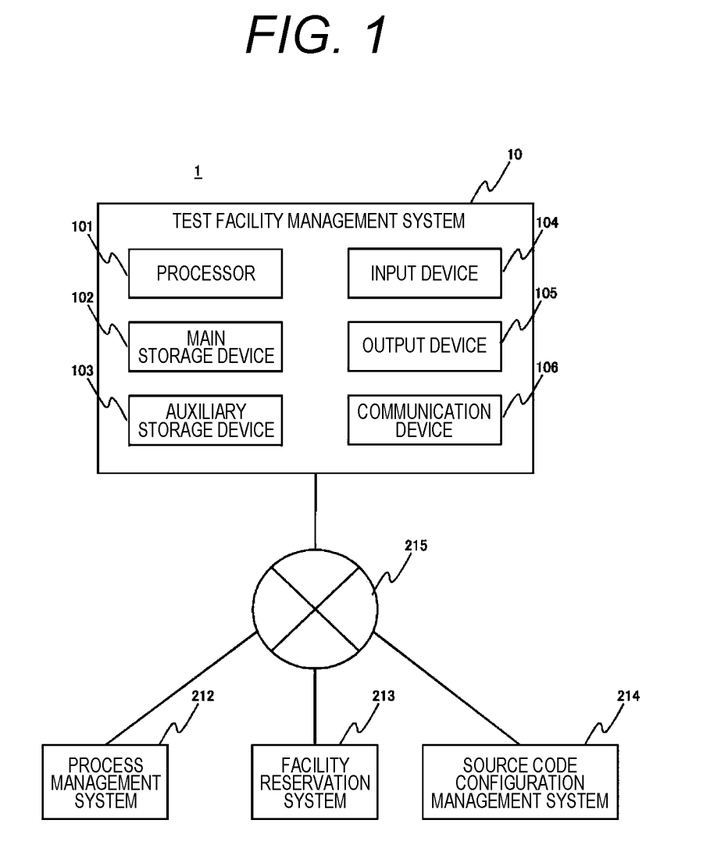
FIG. 1 is a hardware configuration diagram of a computer system according to a first embodiment.

FIG. 1 is a hardware configuration diagram of a computer system according to a first embodiment.

The computer system 1 includes a test facility management system 10 as an example of a process management support system, a process management system 212, a facility reservation system 213, and a source code configuration management system 214. The test facility management system 10, the process management system 212, the facility reservation system 213, and the source code configuration management system 214 are communicably connected via a network 215. The network 215 may be a wide area network (WAN) or a local area network (LAN).

The process management system 212 is a system that manages a schedule planning and a progress result of each process (an example of the software development process) constituting the software development project. The facility reservation system 213 is a system that accepts reservations from software developers regarding test facilities used for software development and manages usage time and users of the test facilities. The source code configuration management system 214 is a system in which a software developer can register a changed file, a changed date and time, a comment, and a changer name every time a change is made to a source code, and a history of changes to the source code can be referred to.

The test facility management system 10 includes a processor 101, a main storage device 102, an auxiliary storage device 103, an input device 104, an output device 105, and a communication device 106.

The processor 101 is composed of, for example, a central processing unit (CPU) and a micro processing unit (MPU). The processor 101 executes various types of processing of the test facility management system 10 by executing programs stored in the main storage device 102. The main storage device 102 is a device that stores programs (for example, a process management support program) executed by the processor 101 and data used in the processor 101, and is, for example, a read only memory (ROM), a random access memory (RAM), a non-volatile RAM (NVRAM), or the like. The auxiliary storage device 103 is a device that stores programs executed by the processor 101 and data (various databases), and is, for example, a solid state drive (SSD), a hard disk drive, an optical storage device, and a reading/writing device for recording medium, or the like. The programs and data stored in the auxiliary storage device 103 are read into the main storage device 102 as needed.

The input device 104 is a device that accepts input of information from a user, and is, for example, a keyboard, a mouse, a touch panel, or the like. The output device 105 is a device that provides (outputs) information to the user, and is, for example, a liquid crystal monitor, a liquid crystal display (LCD), a graphic card, a speaker, or the like. The communication device 106 is a wired or wireless communication interface that realizes communication with other devices (the process management system 212, the facility reservation system 213, the source code configuration management system 214, etc.) via the network 215, and is, for example, a network interface card (NIC), a wireless communication module, a universal serial bus (USB) module, a serial communication module, or the like.

Figure 2:
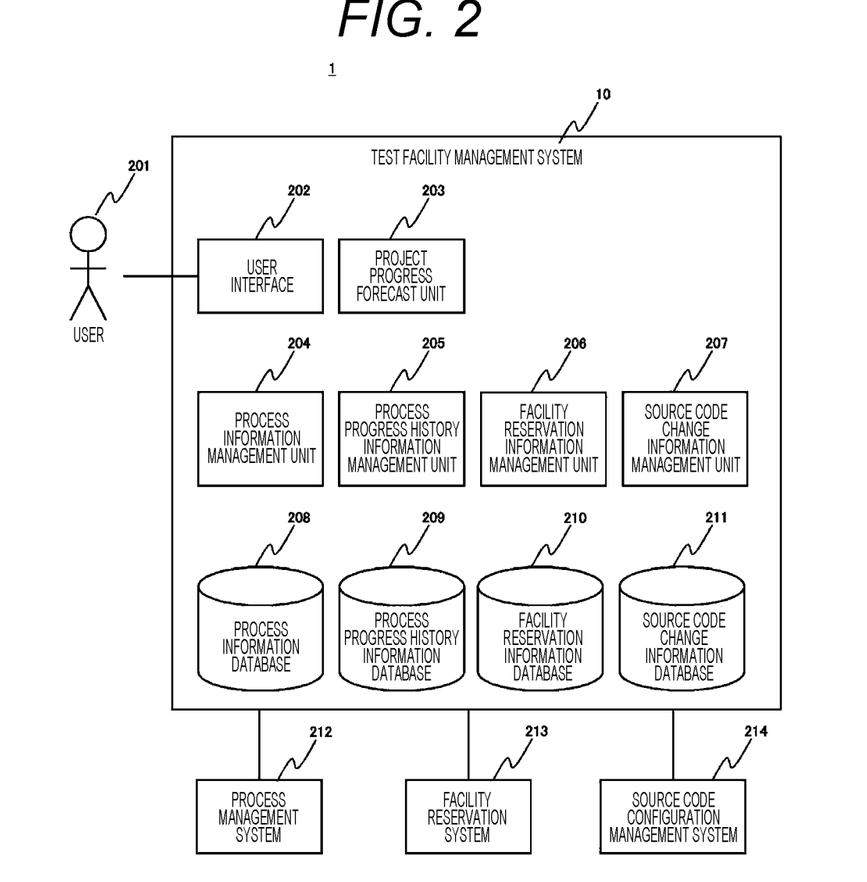
FIG. 2 is a functional configuration diagram of the computer system according to the first embodiment.

FIG. 2 is a functional configuration diagram of the computer system according to the first embodiment.

The test facility management system 10 includes a user interface 202, a project progress forecast unit 203, a process information management unit 204, a process progress history information management unit 205, a facility reservation information management unit 206, and a source code change information management unit 207, a process information database 208, a process progress history information database 209, a facility reservation information database 210, and a source code change information database 211. Note that the user interface 202, the project progress forecast unit 203, the process information management unit 204, the process progress history information management unit 205, the facility reservation information management unit 206, and the source code change information management unit 207 are mainly configured by the processor 101 executing a program (process management support program). The process information database 208, the process progress history information database 209, the facility reservation information database 210, and the source code change information database 211 are constituted of, for example, the auxiliary storage device 103.

The user interface 202 receives from the user 201 an input of an assumption of the amount of change in the count of test facilities that are available in a project (hereinafter referred to as a facility count proposed change). The information on the accepted facility count proposed change is stored in the main storage device 102 or the auxiliary storage device 103. The user interface 202 displays, for the user 201 of the test facility management system 10, a project progress forecast (for example, a project progress forecast screen (see FIGS. 8 and 11)) calculated by the project progress forecast unit 203. The project progress forecast includes a forecast in the case of the count of test facilities available in the project remaining as it is and a forecast in the case of the count of test facilities available in the project being changed. This allows the user 201 of the test facility management system 10 to consider allocating the test facilities to the project to complete the project in a desired time period.

The process information management unit 204 collects process information 30 (see FIG. 3) from the process management system 212, stores the information in the process information database 208, and outputs information of the process information 30 in response to a request from the project progress forecast unit 203.

The process progress history information management unit 205 collects process progress history information 40 (see FIG. 4) from the process management system 212, stores the information in the process progress history information database 209, and outputs information of the process progress history information 40 in response to a request from the project progress forecast unit 203.

The facility reservation information management unit 206 collects facility reservation information 50 (see FIG. 5) from the facility reservation system 213, stores the information in the facility reservation information database 210, and outputs information of the facility reservation information 50 in response to a request from the project progress forecast unit 203.

The source code change information management unit 207 collects source code change information 60 (see FIG. 6) from the source code configuration management system 214, stores the information in the source code change information database 211, and outputs information of the source code change information 60 in response to a request from the project progress forecast unit 203.

Based on the facility count proposed change accepted from the user 201 by the user interface 202, the process information 30 acquired from the process information management unit 204, the process progress history information 40 acquired from the process progress history information management unit 205, the facility reservation information 50 acquired from the facility reservation information management unit 206, and the source code change information 60 acquired from the source code change information management unit 207, the project progress forecast unit 203 calculates a project progress forecast in the case of the count of test facilities available in the project remaining as it is and a project progress forecast in the case of the count of test facilities available in the project being changed.

Figure 3:
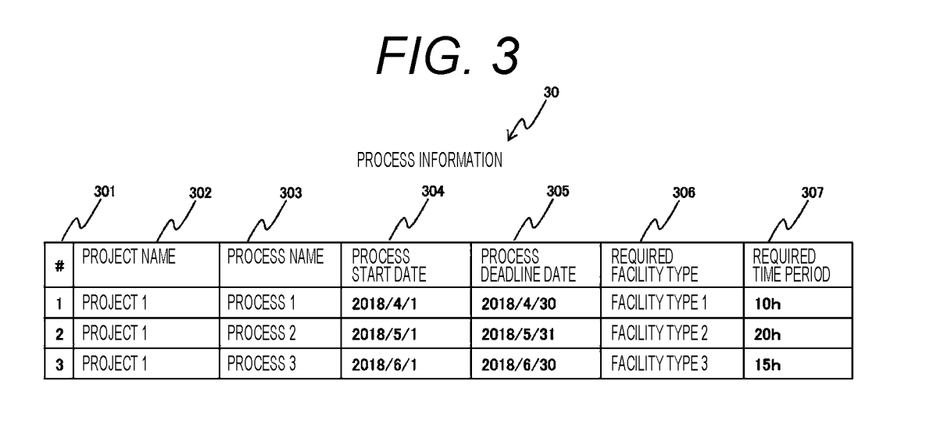
FIG. 3 is a diagram showing an example of process information according to the first embodiment.

FIG. 3 is a diagram showing an example of the process information according to the first embodiment.

The process information 30 stores an entry for each process in each project. The entry of the process information 30 includes fields of a number (#) 301, a project name 302, a process name 303, a process start date 304, a process deadline date 305, a required facility type 306, and a required time period 307.

The number 301 stores a number indicating the entry. The project name 302 stores a name (project name) that uniquely identifies the project corresponding to the entry. The process name 303 stores a name (process name) that uniquely identifies the process included in the project corresponding to the entry. The process start date 304 stores a date when the process of the project corresponding to the entry is started (or the scheduled start date). The process deadline date 305 stores an end deadline date of the process of the project corresponding to the entry. The required facility type 306 stores a type of test facility (facility type) required in the process of the project corresponding to the entry. The required time period 307 stores an estimated time period (required time period: process required time period) required to complete the process of the project corresponding to the entry.

The process information 30 is collected from the process management system 212 by the process information management unit 204, but may be information indirectly derived on the basis of the information managed by the process management system 212. For example, if the correspondence between the process name of the process name 303 and the facility type of the required facility type 306 is determined in advance, the facility type may be specified based on the process name of the process name 303 in the process information management unit 204 even if the process management system 212 does not manage the required facility type in the process, and the facility type may be set in the required facility type 306.

Figure 4:
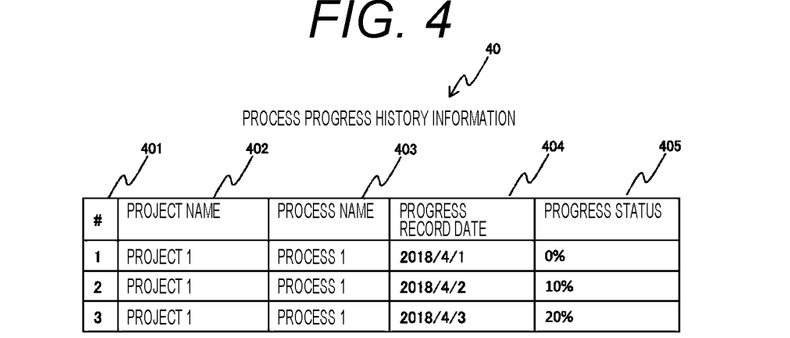
FIG. 4 is a diagram showing an example of process progress history information according to the first embodiment.

FIG. 4 is a diagram showing an example of the process progress history information according to the first embodiment.

The process progress history information 40 stores a plurality of entries indicating the history of progress in the process of the project. The entry for process progress history information 40 includes fields of a number 401, a project name 402, a process name 403, a progress recording date 404, and a progress status 405.

The number 401 stores a number corresponding to the entry. The project name 402 stores a project name of the project corresponding to the entry. The process name 403 stores a process name of the project corresponding to the entry. The progress recording date 404 stores a date (progress recording date) in which a progress corresponding to the entry is recorded. The progress status 405 stores a progress status (for example, a progress rate) as of the progress recording date of the process progress recording date 404 of the project corresponding to the entry. In the example of FIG. 4, the progress status of the progress status 405 is expressed as a percentage, but the progress status is not limited to this, and may be of other forms representing the progress of the process, such as a combination of the entire count of work items included in the process and the count of work items that have been completed at a time point of progress recording date.

The process progress history information 40 may be information indirectly derived on the basis of the information managed by the process management system 212. For example, the process management system 212 may manage only the progress status at a specific time point, and the process progress history information management unit 205 may periodically collect the progress status, add necessary information to the process progress history information database 209, and store the information.

Figure 5:
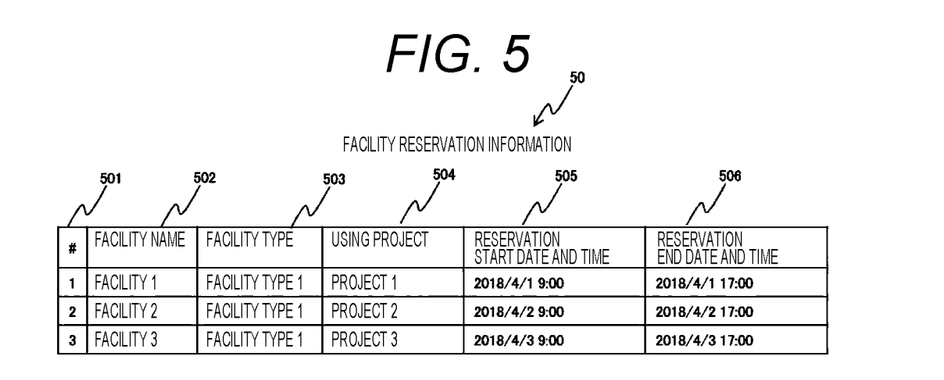
FIG. 5 is a diagram showing an example of facility reservation information according to the first embodiment.

FIG. 5 is a diagram showing an example of the facility reservation information according to the first embodiment.

The facility reservation information 50 stores entries for each reservation for a plurality of test facilities. The entry of the facility reservation information 50 includes fields for a number 501, a facility name 502, a facility type 503, a using project 504, reservation start date and time 505, and reservation end date and time 506.

The number 501 stores a number corresponding to the entry. The facility name 502 stores a name (facility name) that uniquely identifies the test facility to be reserved corresponding to the entry. The facility type 503 stores a name (type name) indicating the type of facility classified by focusing on a usage mode in software development, for the facility having a facility name of the facility name 502 corresponding to the entry. Note that the plurality of facilities may have the same facility type, and in this case, it means that any of these facilities can be used in the process requiring this facility type. For example, in FIG. 3, the required facility type for a process 1 is a facility type 1, but all of a facility 1, a facility 2, and a facility 3 having the facility type 1 in the facility reservation information 50 in FIG. 5 can be used in the process 1.

The using project 504 stores a project name of the project that uses the facility corresponding to the entry. The reservation start date and time 505 stores reservation start date and time of the facility corresponding to the entry. The reservation end date and time 506 stores reservation end date and time of the facility corresponding to the entry.

The facility reservation information 50 may be information indirectly derived on the basis of the information managed by the facility reservation system 213. For example, the facility reservation system 213 may store a user name instead of the using project, and in the facility reservation information management unit 206, the using project may be specified based on the correspondence between the user name and the project that the user is in charge of and may be stored as the facility reservation information 50.

Figure 6:
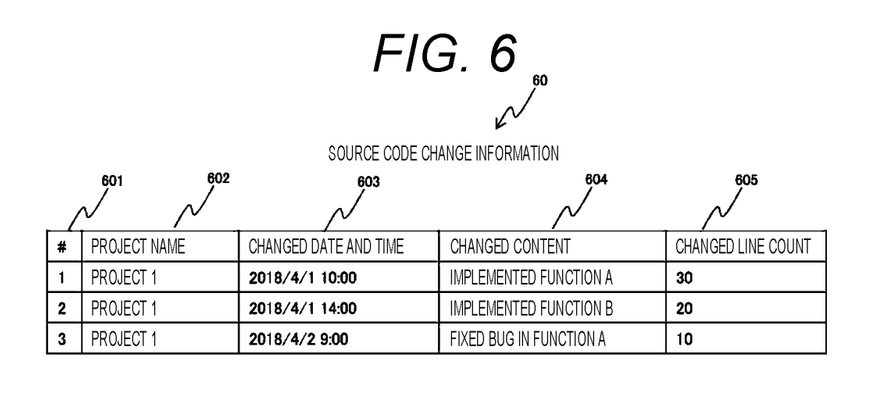
FIG. 6 is a diagram showing an example of source code change information according to the first embodiment.

FIG. 6 is a diagram showing an example of the source code change information according to the first embodiment.

The source code change information 60 stores the corresponding entry for each update of the source code. The entry of the source code change information 60 includes fields of a number 601, a project name 602, changed date and time 603, a changed content 604, and a changed line count 605. The number 601 stores a number corresponding to the entry. The project name 602 stores a project name of the updated project corresponding to the entry. The changed date and time 603 stores date and time when the source code corresponding to the entry is changed. The changed content 604 stores contents of change in the source code corresponding to the entry. The changed line count 605 stores a line count of a location at which the change is made on the source code corresponding to the entry.

The source code change information 60 may be information indirectly derived on the basis of the information managed by the source code configuration management system 214. For example, in the case of a management unit in the source code configuration management system 214 being a repository, the source code change information management unit 207 may specify the project name based on the correspondence between a repository name and the project name, and store the project name in the source code change information 60.

Next, a processing operation by the test facility management system 10 is described.

Figure 7:
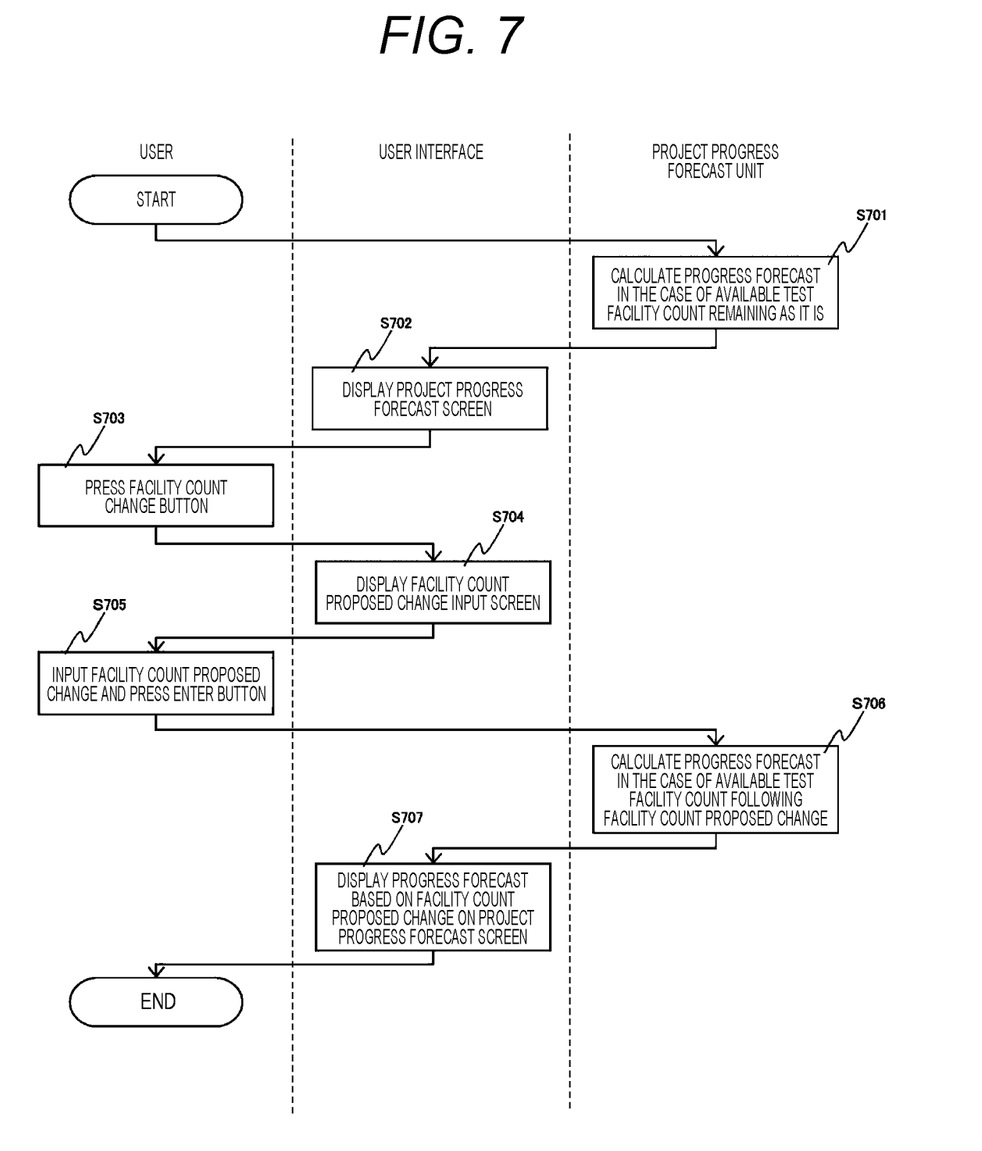
FIG. 7 is a sequence diagram of progress forecast processing by the test facility management system according to the first embodiment.

FIG. 7 is a sequence diagram of progress forecast processing by the test facility management system according to the first embodiment.

In the test facility management system 10, the progress forecast processing is started based on a start instruction by the user. The project progress forecast unit 203 acquires the process progress history information 40 from the process progress history information management unit 205, and based on the acquired process progress history information 40, calculates a progress forecast of a predetermined process (which, for example, may be a process of a project that is determined in advance or a process of a project specified by the user) of a predetermined project in the case of the available test facilities remaining as it is (S701), and passes the result to the user interface 202.

Note that the progress forecast is calculated by, for example, a regression analysis using a progress recording date of the progress recording date 404 and a progress status of the progress status 405 in the process progress history information 40. Further, when the progress forecast is calculated, a delay in progress may be forecasted by referring to the process information 30 acquired from the process information management unit 204 and the facility reservation information 50 acquired from the facility reservation information management unit 206, and for each process, determining that the facility reservation is insufficient based on a period during which the facility specified by the facility type of the required facility type 306 in the process information 30 is reserved.

Next, the user interface 202 creates a project progress forecast screen 80 (see FIG. 8) based on the progress forecast received from the project progress forecast unit 203, and displays the progress forecast on the output device 105 (step S702).

When the user 201 desires to input the facility count proposed change into the test facility management system 10, the user 201 presses a facility count change button 803 (see FIG. 8) displayed on the project progress forecast screen 80 (S703). In response to this, upon detecting that the user 201 has pressed the facility count change button 803, the user interface 202 displays a facility count proposed change input screen 90 (see FIG. 9) (S704), and is ready to accept inputs such as the additional facility count from the user 201.

Figure 9:
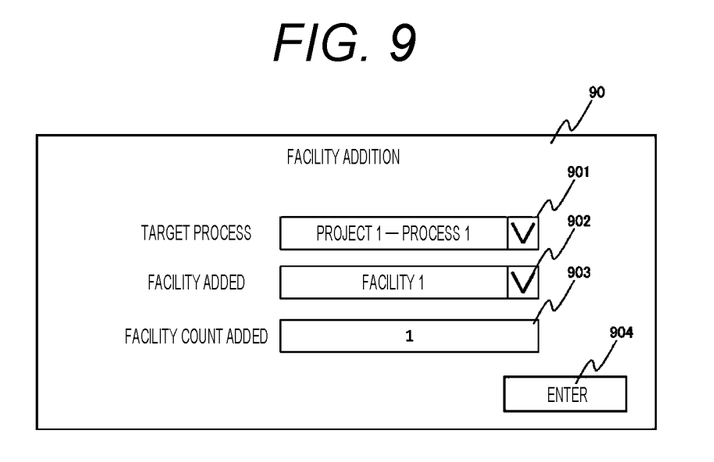
FIG. 9 is an example of a facility count proposed change input screen according to the first embodiment.

When the user 201 desires to input the facility count proposed change, the user 201 inputs the facility count proposed change to the facility count proposed change input screen 90 via the input device 104 and presses an enter button 904 (S705). In response to this, based on the facility count proposed change input in step S705, the project progress forecast calculated in step S701, the facility reservation information 50 acquired from the facility reservation information management unit 206, and the source code change information 60 acquired from the source code change information management unit 207, the project progress forecast unit 203 calculates the project progress forecast in the case of the facility count available in the project being the count specified in the facility count proposed change (changed progress forecast) (S706), and the calculated changed progress forecast is passed to the user interface 202.

Figure 11:
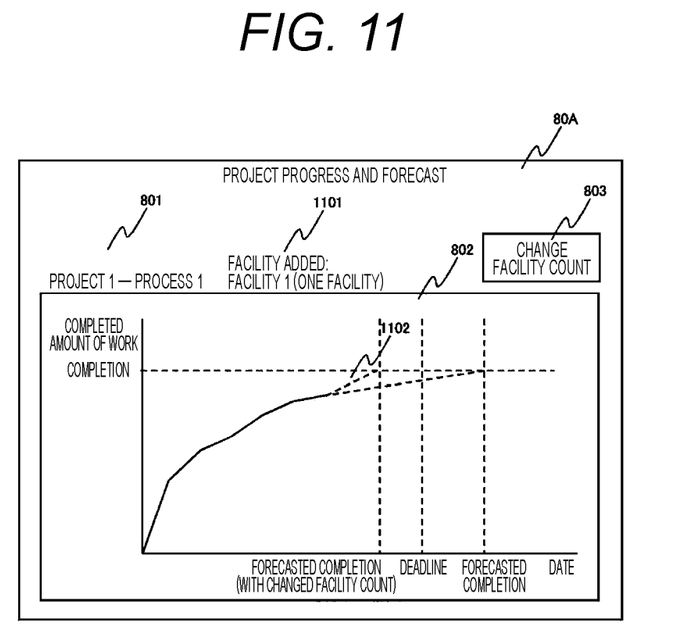
FIG. 11 is an example of the project progress forecast screen in the case when a facility count according to the first embodiment is changed.

Next, the user interface 202 displays the progress forecast calculated by the project progress forecast unit 203 in step S702 and the changed progress forecast calculated by the project progress forecast unit 203 in step S706 on a project progress forecast screen 80A (see FIG. 11).

With the above processing operation, the user of the test facility management system 10 can recognize the forecast of how the progress of the project will change after the facility count proposed change is made, by referring to the project progress forecast screen 80A.

Additionally, in the case of the user 201 desiring to execute the progress forecast based on another facility count proposed change, the facility count change button 803 may be pressed to re-execute steps S703 to S707. In this way, by displaying the progress forecast according to the facility count proposed change input by the user, the user can consider the allocation of the test facilities to the project process in order to complete the project process in a desired period.

Figure 8:
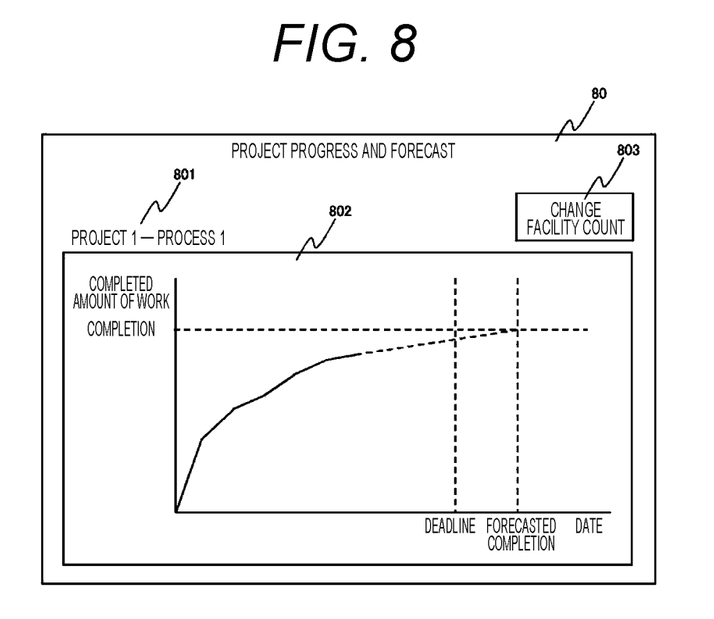
FIG. 8 is an example of a project progress forecast screen according to the first embodiment.

FIG. 8 is an example of the project progress forecast screen according to the first embodiment.

The project progress forecast screen 80 is displayed in step S702 in the progress forecast processing. The project progress forecast screen 80 includes a progress display target name display area 801, a project progress forecast display area 802, and a facility count change button 803.

The progress display target name display area 801 displays a project name and a process name whose progress is to be displayed. The project progress forecast display area 802 displays the current progress in the process of the project to be displayed and the progress forecast calculated by the project progress forecast unit 203 in step S701. In FIG. 8, the progress and the progress forecast of the process are shown by a graph whose vertical axis represents the completed amount of work and horizontal axis represents time, in which the actual progress is shown by a solid line and the progress forecast is shown by a dotted line. However, the progress and the progress forecast may be expressed in other forms. For example, the other forms may be a table in which a work finishing rate and an expected process completion date are recorded, forms such as a gantt chart or a burndown chart, or a graph in a form used in each of the Earned Value Management (EVM) method and the Critical Chain Project Management (CCPM) method. Further, in the example shown in FIG. 8, the progress of one process of one project is displayed in the project progress forecast display area 802, but a plurality of processes of one project may be displayed, the progress of the processes in a plurality of projects may be displayed, or the progress of a part of the processes included in one or the plurality of projects may be displayed.

The facility count change button 803 is a button for receiving an instruction to change the facility count (proposed change of facility) from the user 201. When the facility count change button 803 is pressed, the user interface 202 displays the facility count proposed change input screen 90.

FIG. 9 is an example of the facility count proposed change input screen according to the first embodiment.

The facility count proposed change input screen 90 is displayed by the user interface 202 in step S704 in the progress forecast processing. The facility count proposed change input screen 90 includes a target process input area 901, an additional facility input area 902, an additional facility count input area 903, and the enter button 904.

The target process input area 901 is an area (region) for designating a process being a target of adding the facility. The additional facility input area 902 is an area for designating the additional facility. The additional facility count input area 903 is an area for designating the facility count to be changed, for example, the facility count to be added. The enter button 904 is an area for accepting a decision to change the facility count specified for the facility count proposed change input screen 90.

Next, the project progress forecast method in step S706 in the progress forecast processing is described.

Figure 10:
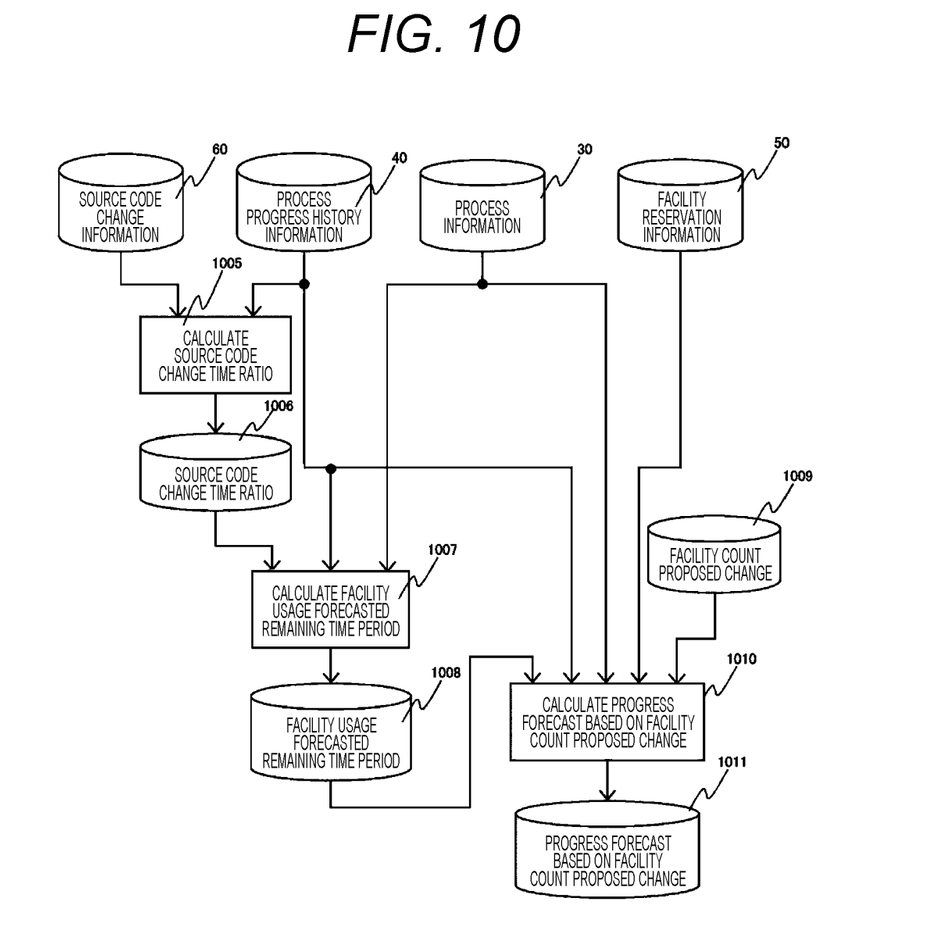
FIG. 10 is a diagram illustrating a project progress forecast method according to the first embodiment.

FIG. 10 is a diagram illustrating a project progress forecast method according to the first embodiment.

In processing 1005, the project progress forecast unit 203 calculates a source code change time ratio 1006 based on the source code change information 60 in the source code change information database 211 and the process progress history information 40 in the process progress history information database 209. Note that the source code change time ratio 1006 is a ratio of the time period required for the work of changing the source code (source code change time period) to the time period required for the software test process. In the software testing process, the presence of a problem with the operation of the program generated from the source code is checked, and if there is a problem, the source code is changed and the operation is checked again. In the present embodiment, it is assumed that the software testing process includes the work of checking the operation of the software using the test facility and the work of changing the source code. In calculating the source code change time ratio, first, the project progress forecast unit 203 multiplies a preset standard value of a change time period required for each line of the source code change, by a changed line count of the source code obtained from the changed line count 605 of the entry of the project including the process being a target of the progress forecast (target process) of the source code change information 60, and calculates the source code change time period. Next, based on the process progress history information 40, the project progress forecast unit 203 sets the date when the progress rate of the progress status of the target process in the progress forecast first rises from 0% as a start date of the target process, and sets time from the start date of the target process to the current time as a process executed time period. Then, the project progress forecast unit 203 sets a ratio of the source code change time period to the process executed time period as the source code change time ratio.

In process 1007, the project progress forecast unit 203 calculates a facility usage forecasted remaining time period 1008 based on the process progress history information 40, the process information 30 in the process information database 208, and the source code change time ratio 1006. Note that the facility usage forecasted remaining time period 1008 is the time forecasted to use the facility until the target process is completed (facility usage remaining time period). In calculating the facility usage forecasted remaining time period 1008, first, the project progress forecast unit 203 calculates a ratio of the remaining work to the total work in the process from the progress rate of the progress status 405 corresponding to the target process in the process progress history information 40. Next, a time period required to complete the remaining work (remaining work required time period) is calculated from the ratio of the remaining work and the required time period of the required time period 307 in the process information 30. Next, the project progress forecast unit 203 forecasts that, in the remaining work required time period, a ratio of time period given by the source code change time ratio 1006 is the time period allocated for the source code change (source code change forecasted remaining time period), and sets the remaining time period as the facility usage forecasted remaining time period.

In process 1010, based on the process progress history information 40, the process information 30, the facility reservation information 50, the facility usage forecasted remaining time period 1008, and a facility count proposed change 1009, the project progress forecast unit 203 calculates a progress forecast 1011 based on the facility count proposed change. In calculating the progress forecast 1011 based on the facility count proposed change, first, the project progress forecast unit 203 calculates a facility usage schedule in the future in the target process, from the facility reservation information 50, the process information 30, and the facility count proposed change 1009. The facility usage schedule is a schedule of an available time range (that is, unreserved time range) for the count of facilities according to the facility count proposed change. When the facility belongs to a specific company, the time when the facility is available may be limited to, for example, the working hours of the company or the working days of the company. Next, the project progress forecast unit 203 forecasts change in the facility usage forecasted remaining time period in the future from the facility usage schedule in the future and the facility usage forecasted remaining time period 1008. Additionally, in the case of a plurality of facilities being available in a certain time period, it is assumed that the work can be carried out in parallel by the plurality of facilities up to the count of facilities specified in advance for the process, and from the facility usage forecasted remaining time period, the total usage time may be reduced for the count of facilities used in parallel. Next, the project progress forecast unit 203 assumes that the time when the facility is not available in the facility usage schedule can be allocated to the source code change, and forecasts the future change of the source code change forecasted remaining time period. Next, the project progress forecast unit 203 obtains the change in the forecasted remaining time period by calculating the forecasted remaining time period obtained by adding the facility usage forecasted remaining time period and the source code change forecasted remaining time period at each time point, and based on this, calculates the progress forecast based on the facility count proposed change. Note that if the facility usage forecasted remaining time period becomes zero before the source code change forecasted remaining time period, it is assumed that a part of the facility usage time allocated in the facility usage schedule is used for the source code change, and the facility usage forecasted remaining time period and the source code change forecasted remaining time period may be calculated.

FIG. 11 is an example of the project progress forecast screen when the count of facilities according to the first embodiment is changed.

The project progress forecast screen 80A is a screen displayed by the user interface 202 in step S707 of the progress forecast processing. The project progress forecast screen 80A further displays facility count change information 1101 and a facility count changed-time progress forecast 1102 on the project progress forecast screen 80 shown in FIG. 8. The facility count change information 1101 indicates the changed facility to be the target of the progress forecast entered in the facility count proposed change input screen 90.

The facility count changed-time progress forecast 1102 indicates the project progress forecast when the facility count is changed and indicated in the facility count change information 1101. In the present embodiment, the facility count changed-time progress forecast 1102 is displayed on the same graph as the progress forecast before the change. The facility count changed-time progress forecast 1102 allows the project manager to know how much the change in the facility count contributes to the early completion of the project by comparing with the progress forecast before the change. Therefore, it becomes possible to consider the reviewing of the allocation of facilities to the project and the addition of facilities by purchasing facilities.

Second Embodiment

Next, a test facility management system 10 according to a second embodiment is described. The test facility management system 10 according to the second embodiment is configured to further indicate excess or shortage of facilities over the plurality of projects in the test facility management system 10 according to the first embodiment, and if there is a project with shortage in facilities, configured to display a screen for supporting decision to review the allocation of the test facilities (a project progress forecast screen 130: see FIG. 13). In the following description, the same configuration as the configuration of the test facility management system 10 according to the first embodiment is described using the same reference numerals.

Next, the progress forecast processing by the test facility management system 10 according to the second embodiment is described.

Figure 12:
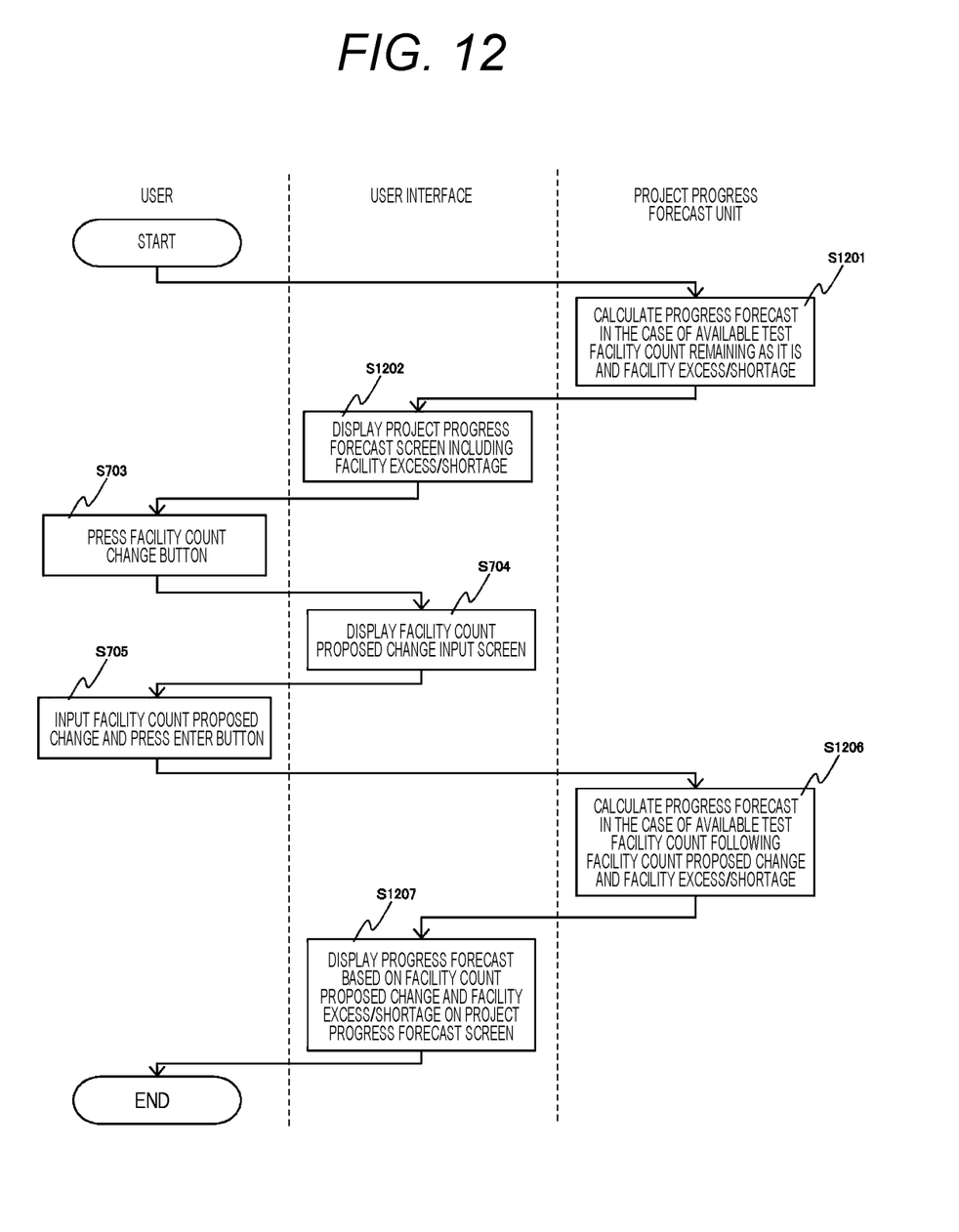
FIG. 12 is a sequence diagram of progress forecast processing according to a second embodiment.

FIG. 12 is a sequence diagram of the progress forecast processing according to the second embodiment. The steps that are the same as in the progress forecast processing according to the first embodiment are designated by the same reference numerals, and the duplicate description is omitted.

In step S1201, the project progress forecast unit 203 calculates facility excess/shortage in the project in addition to the project progress forecast calculated in step S701 of FIG. 7. The facility excess/shortage is information indicating excess or shortage of facilities reserved in the project, and has stages such as "sufficient", "appropriate", and "insufficient". The project progress forecast unit 203 calculates the facility excess/shortage by, for example, referring to the facility reservation information 50 acquired from the facility reservation information management unit 206, calculating a facility reservation time period for each project, and comparing the reservation time period with the time period required to use the facility (facility required time period). The facility required time period may be, for example, a time period obtained by excluding a portion of the source code change time ratio from the required time period of the required time period 307 in the process information 30.

Figure 13:
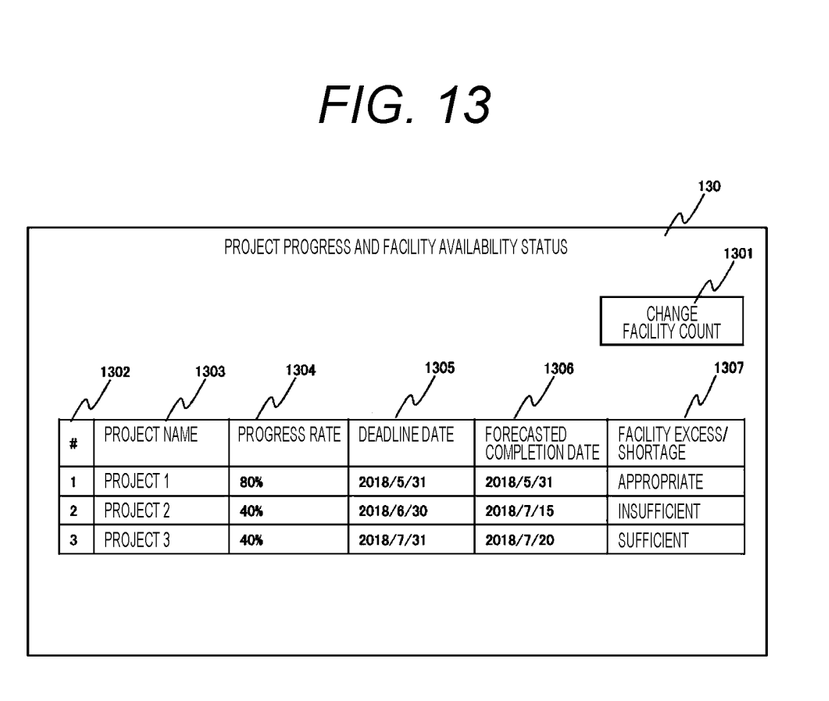
FIG. 13 is an example of a project progress forecast screen according to the second embodiment.

In step S1202, the user interface 202 displays the progress forecast and the facility excess/shortage calculated by the project progress forecast unit 203 in step S1201 on the project progress forecast screen 130 (see FIG. 13).

In step 1206, in addition to the project progress forecast (for example, forecasted completion date) calculated in step S706 in FIG. 7 in the case of the facility count available in the project being specified in the facility count proposed change, the project progress forecast unit 203 also calculates the facility excess/shortage in this case. The project progress forecast unit 203 calculates the facility excess/shortage by calculating the facility reservation time period based on, for example, the facility count proposed change and the facility reservation information 50 acquired from the facility reservation information management unit 206, and comparing the reservation time period with the facility required time period.

In step 1207, the user interface 202 displays on the project progress forecast screen 130, the progress forecast and the facility excess/shortage calculated by the project progress forecast unit 203 in step S1201, and the project progress forecast and the facility excess/shortage calculated by the project progress forecast unit 203 in step S1206 in the case of the facility count available in the project being specified in the facility count proposed change.

FIG. 13 is an example of the project progress forecast screen according to the second embodiment.

The project progress forecast screen 130 is a screen displayed in step S1202 and step S1207. The project progress forecast screen 130 includes a facility count change button 1301, a number 1302, a project name 1303, a progress rate 1304, a deadline date 1305, a forecasted completion date 1306, and a facility excess/shortage 1307.

The facility count change button 1301 is a button that receives an instruction to change the facility count from the user 201. When the facility count change button 1301 is pressed, the user interface 202 displays the facility count proposed change input screen 90.

The number 1302 displays the number of a line corresponding to a project. The project name 1303 displays a project name. The progress rate 1304 displays a progress status of the project (for example, the progress rate). The progress rate is calculated based on, for example, the progress rate of the progress status 405 in the process progress history information 40. The deadline date 1305 displays a deadline date of the project. The deadline date of the project is calculated using, for example, the process deadline date of the process deadline date 305 in the process information 30. The forecasted completion date 1306 displays a date on which the completion of the project is forecasted (forecasted completion date) on the basis of the process progress history so far. The forecasted completion date is calculated based on the progress forecast calculated by the project progress forecast unit 203 in step S701. The facility excess/shortage 1307 displays the facility excess/shortage calculated by the project progress forecast unit 203 in step S1201 and step S1206.

The project progress forecast screen 130 displayed in step S1207 may display the facility count change information in a format as in the facility count change information 1101 shown in FIG. 11 in the first embodiment.

According to this project progress forecast screen 130, by showing the excess or shortage of facilities over the plurality of projects on the same screen, the user can easily recognize the project having an insufficient count of facilities and the project having a sufficient count of facilities, and can appropriately review the allocation of the facilities. The screen can also be used to consider the addition of the test facility.

The present invention is not limited to the above-described embodiments, and can be appropriately modified and implemented without departing from the spirit of the present invention.

For example, in the above embodiments, each process in the project is regarded as an example of the software development process, but the present invention is not limited to this, and for example, the entire project including a plurality of processes may be regarded as an example of one software development process.

Further, in the above embodiments, a part or all of the processing performed by the processor may be performed by a hardware circuit. In addition, the program in the above embodiments may be installed from a program source. The program source may be a program distribution server or a storage medium (e.g., a portable storage medium).

REFERENCE SIGNS LIST

10 test facility management system
101 processor
102 main storage device
103 auxiliary storage device
201 user
202 user interface
203 project progress forecast unit
204 process information management unit
205 process progress history information management unit
206 facility reservation information management unit
207 source code change information management unit
208 process information database
209 process progress history information database
210 facility reservation information database
211 source code change information database

The invention claimed is:

1. A process management support system that supports management of a software development process requiring use of facilities, the system comprising:
a storage unit storing information; and a processor unit connected to the storage unit and executing predetermined processing,
wherein the storage unit stores:
process information indicating the facilities used in the software development process;
facility reservation information indicating reservation statuses of a plurality of the facilities;
process progress history information indicating a progress history of the software development process; and
facility count proposed change information indicating proposed change of a count of the facilities used in the software development process, and
wherein the processor unit is configured to:
calculate, based on the process progress history information, a facility usage remaining time period being a remaining time period required for a test using the facilities indicated by the process information in the software development process;
specify, based on the facility reservation information, an available time range during which the facilities of the count of the proposed change indicated by the facility count proposed change information are available;
forecast, based on the available time range, a progress of the software development process in a case when work for the facility usage remaining time period is changed to be carried out by the facilities of the count of the proposed change; and
output information on the forecasted progress after the change.

2. The process management support system according to claim 1,
wherein the software development process includes creation work of creating a source code and test work of testing the source code using the facilities,
wherein the process information includes a process required time period being a time period required for the software development process,
wherein the storage unit stores source code change information indicating an amount of source code change, and
wherein the processor unit is configured to:
estimate, based on the amount of source code change, a source code change time period being a time period required to change the amount of source code change;
specify, based on the amount of source code change and the process progress history information, a facility required time period being a time period required for the test work during the process required time period; and
calculate, based on the facility required time period and the process progress history information, the facility usage remaining time period.

3. The process management support system according to claim 1,
wherein the processor unit accepts the proposed change from a user.

4. The process management support system according to claim 1,
wherein the processor unit outputs the information on the progress after the change together with information of the progress before the change.

5. The process management support system according to claim 4,
wherein the processor unit displays the information on the forecasted progress after the change and the information on the forecasted progress before the change in a comparable graph.

6. The process management support system according claim 1,
wherein the process information includes a process required time period being a time period required for the software development process, and
wherein the processor unit is configured to:
determine, based on a reservation time period of the facilities in the software development process and the process required time period, excess or shortage of the facilities; and
output a determination result of the excess or shortage of the facilities.

7. The process management support system according to claim 6,
wherein the storage unit stores process information, facility reservation information, process progress history information, and facility count proposed change information in a plurality of software development processes, wherein the process information includes a process required time period being a time period required in each of the plurality of software development processes, and wherein the processor unit is configured to:

determine excess or shortage of the facilities in the plurality of software development processes; and output a determination result of the excess or shortage of the facilities for the plurality of software development processes.

8. A process management support method being a method of supporting management of a software development process by a process management support system that supports the management of the software development process requiring use of facilities, wherein the process management support system is configured to:

store process information indicating the facilities used in the software development process, facility reservation information indicating reservation statuses of a plurality of the facilities, process progress history information indicating a progress history of the software development process, and facility count proposed change information indicating proposed change of a count of the facilities used in the software development process;

calculate, based on the process progress history information, a facility usage remaining time period being a remaining time period required for a test using the facilities indicated by the process information in the software development process;

specify, based on the facility reservation information, an available time range during which the facilities of the count of the proposed change indicated by the facility count proposed change information are available;

forecast, based on the available time range, a progress of the software development process in a case when work for the facility usage remaining time period is changed to be carried out by the facilities of the count of the proposed change; and output information on the forecasted progress after the change.

9. A process management support non-transitory computer-readable recording medium, the computer-readable recording medium storing instructions that, when executed by a computer, constitute a process management support system that supports management of a software development process requiring use of facilities, wherein the instructions cause the computer to:

calculate, based on a process's progress history information indicating a progress history of the software development process, a facility usage remaining time period being a remaining time period required for a test using the facilities indicated by the process's progress history information indicating the facilities used in the software development process;

specify, based on a facility's reservation information indicating reservation statuses of a plurality of the facilities, a specified available time range during which the facilities of a count of proposed change indicated by facility count proposed change information indicating proposed change of the count of the facilities used in the software development process are available;

forecast, based on the specified available time range, a progress of the software development process in a case when work for the facility usage remaining time period is changed to be carried out by the facilities of the count of the proposed change; and output information on the forecasted progress after the change.

* * * * *